May 21, 1963   H. O. CORBETT   3,090,076
APPARATUS AND PROCESS FOR HIGH SPEED EXTRUSION CASTING
Filed May 20, 1959   2 Sheets-Sheet 1
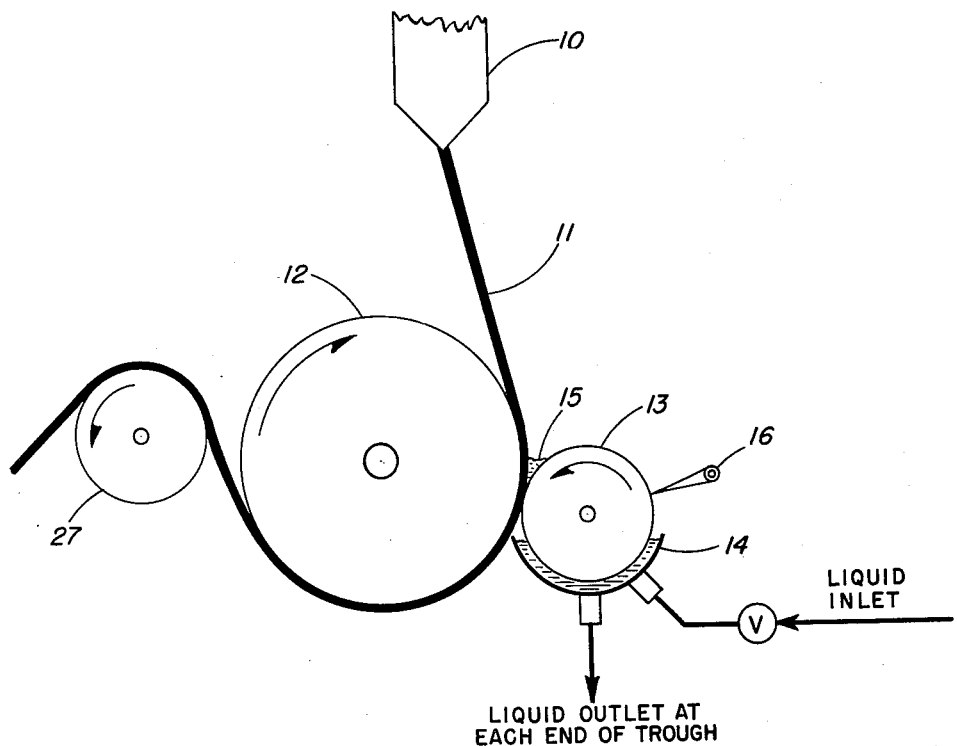
FIGURE I
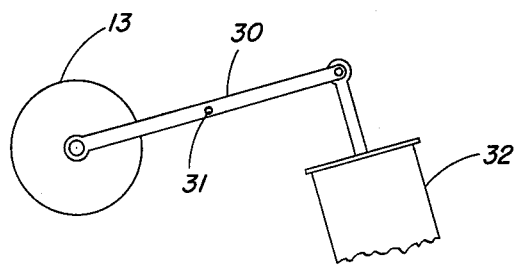
FIGURE II
HERBERT O. CORBETT
*INVENTOR.*
BY *Mitchell G. Condos*

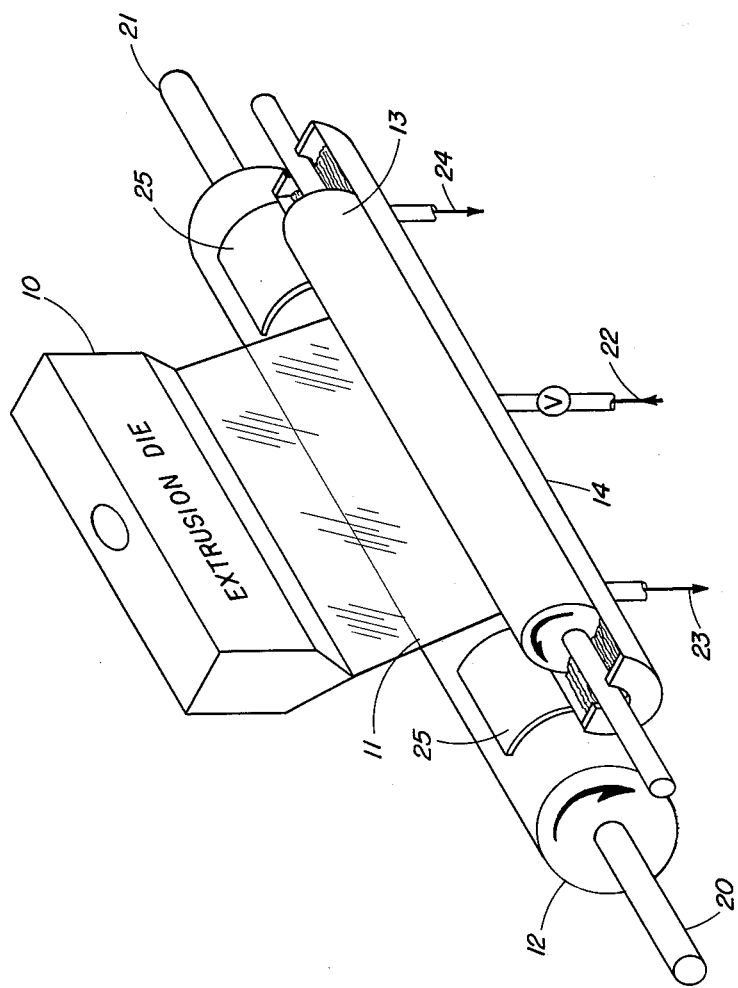
FIGURE III

United States Patent Office 3,090,076
Patented May 21, 1963

3,090,076
APPARATUS AND PROCESS FOR HIGH SPEED
EXTRUSION CASTING
Herbert O. Corbett, Palmyra, N.Y., assignor to National
Distillers and Chemical Corporation, a corporation of
Virginia
Filed May 20, 1959, Ser. No. 814,479
8 Claims. (Cl. 18—15)

The present invention relates to a novel method and apparatus for production of sheets, films, etc. by high speed extrusion casting of polymeric synthetic substances. More particularly, the invention relates to the production of thin film of exceptional clarity by high speed extrusion casting of normally solid polymers of ethylenically unsaturated substances, such as thermoplastic polymers of monoolefinic lower molecular weight aliphatic hydrocarbons including polyethylene, polypropylene, butene-1, copolymers thereof, and the like, as well as other thermoplastic substances such as polymers and copolymers of vinyls, such as styrene, polyamides such as nylon, acrylic polymers, cellulosic polymers, and others.

As far as I am aware, extrusion processes heretofore employed for production of sheets, films, etc. from polymeric materials of the aforesaid types are limited to relatively low extrusion velocities and, for example, are not practical at substantially high extrusion velocities, such as 400 feet per minute or above since endeavors to operate at such high velocities produces film that is not of satisfactory quality and possesses undesirable properties and/or combination of properties. For example, in processes wherein the polymeric material is extruded as a melt from a slot die into a water cooling bath, the extrusion speed is limited to the substantially low velocities at which carry-over of water by the surface of the plastic web does not become too great to tolerate. A further disadvantage of such a method is that the critical speed decreases when certain additives (e.g., slip agents) are present in the polymeric material as such additives generally promote carry-over of water. In another method wherein the melt is extruded from a circular die to form a bubble which is cooled by air impingement on the molten plastic surface, speeds are limited to relatively low rates dependent on the rate of cooling that is possible at reasonable air velocities and temperatures. In still other processes, wherein the molten polymer is extruded from a slot die onto a cooled, polished metal roll, speeds are limited to those which are substantially low and at which irregular occlusion of air between the molten plastic web and the roll does not occur to a deleterious extent as such occlusion of air results in production of sheets and film that contain bubbles, dimples, etc. and, hence off-quality film that in addition cannot be rolled into a compact tight roll. Such difficulties are encountered mainly due to the occluded air which prevents the film from laying flat and in substantially uniform and complete contact with the roll.

The main object of the present invention is to provide a process and apparatus for extrusion of polymeric materials into films of exceptional quality at heretofore unattainable extrusion speeds. A further object is to provide such a process and apparatus, for production of films of such materials, whereby the limitations to high speed extrusion encountered in prior art processes are obviated. A still further object is to provide a process and apparatus that enables production of thin films of thermoplastic polymeric materials at relatively high extrusion speeds and which films possess a unique desirable combination of properties including exceptionally high impact, high clarity ("see-through"), extremely smooth micro-fine surface, and "cling" characteristics. Still other objects and advantages provided by the present invention will be apparent from the more detailed description thereof set forth hereinafter.

In broad aspect, the invention embodied herein is primarily directed to an extrusion method wherein a plastic web of the polymeric material is cast on a chilled rotating roll in a manner and under conditions to prevent occlusion of air between the plastic web and the roll along with effective controlled cooling of the plastic web while minimizing or obviating embossing of the plastic web whereby film of excellent quality and "see through" characterisitcs is obtained at heretofore unattainable extrusion speeds for casting on chilled rolls.

In accordance with this invention, a melt extruded film of the polymeric material is drawn onto the surface of a rotating chilled roll having a smooth surface and, shortly after the film initially contacts said chilled roll and is still in contact therewith, the film is passed through a nip formed by said chilled roll and a "resilient" pressure roll (rotatable contra to the chilled roll) while maintaining the pressure roll wet with a suitable liquid so as to interpose a film of said liquid between the pressure roll and the hot film surface. In a particular suitable aspect, there is maintained only in the nip between the film and the "resilient" roll, a pool of a suitable liquid with the surface of said pool being maintained at an elevation that does not substantially exceed but preferably is at substantially the same or at a lower elevation than the initial point of contact of the molten film with the chilled roll.

In carrying out such a process, wherein the molten film initially contacts the chilled roll, it has been found that occlusion of air is prevented between the film and chilled roll by the subsequent contact with the pressure roll whereby the film surface lays flat on the chilled surface, is subjected to uniform cooling, and is obtained as a film of exceptional smoothness and uniformity of film thickness. Moreover, by the resulting support provided for the film laying flat on the chilled roll, film breakage and wobbling of the film is obviated.

By use of such a process, it has been found that flat, glossy film having controlled, excellent physical properties can be produced at exceptionally high extrusion speeds limited only by the "melt fracture" velocity of the polymer being extruded. Obtainment of such results is made possible by use of the "resilient" pressure roll which is so disposed as to apply pressure on the film passing through the nip formed by the metal roll with the "resilient" pressure roll whereby it has been found that air is prevented from being drawn under the molten web as it lays down on the chilled roll. By maintaining the "resilient" pressure roll wet with a suitable liquid, such as by maintaining a pool or liquid as aforesaid between the resilient pressure roll and the plastic web, the web is pre-chilled in a precisely controlled manner with transiential hardening of the outside surface of the molten web being effected, thereby preventing damage of the gloss of the film surface by the resilient roll even at the exceptionally high extrusion rates obtainable by practice of this invention.

For such a purpose, the chilled roll should have a smooth metal surface and highly polished chrome plated rolls have been found to be particularly suitable. However, rolls made of other materials such as rolls having a surface of smooth, highly polished steel, aluminum, etc. may also be used. With respect to the resilient roll, the surface thereof should comprise a material that possesses resiliency characteristics and, for example, materials such as silicone rubber, neoprene, natural rubber, Teflon, fibers, etc. may be used.

Regarding the liquid for use in maintaining wet the resilient roll, any liquid that does not attack or react disadvantageously with the polymer film and has a sufficiently high boiling point so as not to boil under the operating conditions employed for the process used. For most purposes, water is suitable as well as aqueous mixtures of substances such as ethylene glycol, diethylene glycol, glycerin and others. The temperature of the liquid used for such a purpose, as for maintaining a pool of liquid in between the resilient roll and the plastic web, must in operation of the process be kept below the melting point of the polymer to aid in solidifying the film and to obviate the film distortion that would result by turbulency in the liquid pool if boiling of the liquid occurs.

In accordance with the apparatus features of this invention, such apparatus comprises a pair of contra-rotatable rolls, one of said rolls being a driven roll having a smooth metal surface maintainable at a temperature below the solidification temperature of the extruded polymer and the other roll having a resilient surface, said rolls being disposed with respect to each other such that they form a nip with the resilient roll exerting pressure at the nip, means for extruding a molten film of a polymer material tangentially onto the metal surfaced roll in the direction of rotation of said metal roll at a point prior to said nip whereby the molten film remains in contact with the metal roll prior to passage through said nip whereat pressure is exerted on said film by the resilient roll, and means for maintaining in between said film and said resilient roll a film of a liquid that (1) is inert with respect to said film, (2) wets the resilient roll such that a thin layer of said liquid is constantly interposed between the film and the resilient roll which is contra-rotatable to said metal surfaced roll, and (3) when the process is carried out with maintenance of a liquid pool as aforesaid, the surface of said pool is kept at an elevation not substantially higher than the elevation of the initial contact of the molten film with the metal surfaced roll. The weight of the liquid pool against the molten film initiates the air exclusion thereby appreciably reducing the severity of the action as would otherwise be required from the resilient nip roll.

In order to further describe an apparatus such as is embodied herein, reference is made to the accompanying drawings which illustrate by way of example a specific embodiment of such apparatus. In the drawings, FIGURE I shows such an embodiment in vertical section; FIGURE II shows an embodiment of a means for maintaining desired pressure on the pressure roll; and FIGURE III shows in perspective an apparatus such as shown in FIGURE I with a more detailed embodiment of means suitable for maintaining the aforesaid pool of liquid in between the resilient roll and the plastic web.

In these drawings, 10 is an extrusion die containing the molten polymer to be extruded and from which freshly extruded molten film 11 is drawn down tangentially onto a highly polished metal roll 12 such that the film lays on the metal roll in the direction of rotation of roll 12 prior to passage of the film through the nip formed by the metal roll 12 and resilient pressure roll 13, the surface of which is comprised of a resilient material and which roll 13 is contra-rotatable to roll 12. Suitable means, such as trough 14, is supplied with a suitable liquid by an appropriate inlet at one end of the trough and a liquid outlet at the opposite end of the trough such as to maintain sufficient liquid in the trough for the roll 13 to carry over water into pool 15 to maintain a pool of liquid in between film 11 and roll 13. Suitable means, such as control vane 16, is so disposed as to control the amount of liquid carried over by roll 13 during its rotation to prevent the surface of pool 15 from rising to a higher than desired elevation.

In FIGURE II there is shown pressure roll 13 with an embodiment for applying pressure and, as shown, said means comprises lever arm 30, pivotable at pivot 31, and which is controlled for application of desired pressure on roll 13 by means of pneumatic piston 32.

FIGURE III shows in perspective a cooled highly polished metal roll 12, the surface temperature of which is controlled by introduction of a suitable coolant (e.g., water) into roll 12 via inlet 20 and withdrawal of water via outlet 21. As shown, film 11 is extruded from extrusion die 10 onto roll 12 with the film contacting roll 12 prior to the nip formed with resilient roll 13 which exerts, on the film passing in between roll 12 and roll 13, a pressure resulting from the weight of the roll itself or, if desired, added pressure can be obtained by adding weights to roll 13. For such an embodiment as shown in FIGURE III, trough 14 contains a liquid inlet 22 and liquid outlets 23 and 24 for withdrawal of water from the trough. Disposed in suitable manner, so as to prevent liquid from being carried over by the metal roll 12, are stationary felts 25 which serve as wipers and to deflect liquid into trough 14, thereby preventing liquid from getting on metal roll 12 in the portion thereof contacting film 11 as the presence of liquid in between film 11 and roll 12 deleteriously affects the process due to formation of bubbles, dimples, etc. thereby precluding extrusion at the desired high speeds. Also shown (FIG. I) is idler roll 27 which may be used to carry the film following its take off from chill roll 12 on which the film is generally allowed to remain until fully quenched and stabilized. If desired, however, and particularly when additional cooling is necessary or desirable, the film taken off from chilled roll 12 can be passed over one or more additional chilled rolls prior to passage over idler roll 27.

Although the operating conditions and apparatus embodied herein may be modified depending on the particular polymer to be extruded and the desired control of film properties, such control being due to the flexibility of the invention with respect to temperatures utilized for the chilled metal roll and for the liquid with which the pressure roll is wetted, the residence time of the molten web on the metal roll, etc., the invention has a particularly important application in production of films having a thickness in the range of about one quarter of a mil to about ten mils, and preferably up to about four mils from polymeric materials having a density of from about 0.90 to about 1.70 and which melt at from about 150° F. to 250° F. Polymers included therein are polyethylenes, polypropylenes, vinylidine chloride copolymers, certain nylons, etc. with a more specific illustration being a polyethylene having an average density of about 0.93 and a melting point of about 215° F. For polymers of such properties, practice of the present invention enables extrusion of film at speeds in excess of 700 feet/minute which, as far as I am aware, are far and above any speeds attainable with heretofore employed extrusion processes without encountering production of off-quality film due mainly to occlusion of air and embossing of the film. Moreover, even at such high extrusion speeds, the flexibility of the present invention is such that conditions of operation can be modified without limiting extrusion speeds whereby films having different properties can be made as desired from the same polymer.

In further illustration of the exceptionally high extrusion speeds made possible by practice of this invention, and as specific embodiments, polyethylene film of exceptional clarity ("see through") and high impact has been produced at the rate of at least 720 feet/minute by use of the following conditions and apparatus. It should be understood, however, that such conditions and data are set forth solely for the purpose of illustrating specific embodiments of the invention and it is not intended that the invention be limited thereto.

Properties of polyethylene__ Density of 0.91–0.96.
    Melting Point 200–265° F.
Extrusion die_____ 34" long, orifice width 32"
Temperature of polymer
  in extruder_____ 325° F.
Temperature of melt leaving
  die orifice_____ 310° F.

| | |
|---|---|
| Thickness of molten film in draw down | 0.001″. |
| Draw down distance from extruder orifice to metal roll | 2–8″. |
| Chilled roll | Highly polished chrome plated roll of 8″ diameter, 48″ long. |
| Resilient roll | Silicone rubber covered, 4″ diameter. |
| Temperature of metal roll | Skin temperature maintained below about 190° F. by controlled introduction of water at 60–170° F. into metal roll. |
| Pressure exerted by pressure roll | 5–50 lbs./inch. |
| Temperature of liquid (water) in trough | 60–180° F. |
| Height (vertical distance) of liquid pool in between resilient roll and film | Maintained at 1–1½″. |
| Angle of passage of melt from extruder to metal roll (angle between molten film and a perpendicular dropped from the die orifice) | 15° |
| Vertical distance between the nip and the elevation at which the film initially contacts the metal roll | ½″–8″, preferably 1½–3″. |

Under comparable conditions, but with elimination of the resilient pressure roll and the pool of water in between said roll and the film, extrusion of 300 feet/minute could not be achieved without production of off-quality film due to occlusion of air in between the chilled roll and the film; and, under comparable conditions but with elimination of the pool of water in between the pressure roll and film, not only was it impossible to attain extrusion speeds on the order of those attained by practice of this invention but deleterious marring of the film surface by the pressure roll occurred whereby film of less than desired see-through characteristics was obtained.

With further reference to the pressure roll, such a roll can, if desired, be driven in which case it is preferable that it be rotated at slightly less surface feet per minute than the chilled metal roll. In preferred embodiment, however, the pressure roll is not driven but is allowed to rotate from the friction of the film as, in such a manner, a slight backward tendency occurs which serves to aid in preventing air occlusion over and above the pressure exerted on the film by the resilient pressure roll. Moreover, and if desired, the pressure roll can be cooled, such as by internal cooling provided by passage of cooling water therethrough, to aid in maintaining the pool of liquid below the boiling point of the liquid.

In practice of this invention, it has been found that by use of a resilient pressure roll, coupled with use of a suitable liquid in between the film and the pressure roll as aforedescribed, material and marked advantages are obtained. Of considerable importance, it has been found that by use of the pressure roll, objectionable occlusion of air is eliminated between the hot web and the chilled metal roll thereby eliminating deleterious puckering, dimpling or bubbling of the film or sheet. By use of the combination of the chilled metal roll, the resilient pressure roll and a suitable liquid in between the pressure roll and hot web, another material advantage is the obtainment of film that is of excellent "see through" clarity as the liquid serves to prevent embossing of the film by the surface of the resilient material of the pressure roll even at the extremely high extrusion speeds embodied herein. Moreover, by use of a pool of liquid, as aforedescribed, the weight of the liquid pool pressing against the hot film supported by the chilled roll also aids to prevent occlusion of air between the chilled roll and the film and further serves to distinguish the present invention over prior art processes wherein extrusion is carried out by vertically passing a molten film through the nip of two contra-rotating metal rollers with a pool of water being maintained on each side of the film in the nip. As compared to such a process wherein the molten film initially contacts the water, the present invention wherein the hot web initially contacts the chilled roll provides for a much more effective control over the cooling of the film whereby high extrusion rates can be obtained with control of the physical properties of the film to different properties as may be desired from the same polymer.

In further reference to the apparatus aspects of this invention, it should be understood that means other than those specifically described may be used for maintaining a pool of liquid in between the pressure roll and film, for controlling the elevation of the surface of the pool of liquid, for cooling the metal roll, for preventing carry-over of liquid by the cooled metal roll, and the like, and that such modifications are within the scope of this invention.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A method for forming films of thermoplastic materials, comprising extruding said film substantially in a plane tangential to the surface of a rotating, chilled casting roll in the direction of rotation of said roll and into initial surface contact with said roll along a line lying in said tangential plane; compressing said film between said casting roll surface and the surface of a parallel, substantially tangential contra rotating nip roll along the line of tangency therebetween immediately beneath the point of initial contact of said film with said casting roll and tangential therewith forming and maintaining a pool of a liquid, inert with respect to said thermoplastic material, between said nip roll and the surface of said film exposed on said casting roll, wherein the upper surface of said pool is established at a level vertically above said line of tangency between said rolls but not substantially above the level of a horiontal plane extended through said line of initial contact of said film with said casting roll surface; and positively engaging said film with said casting roll surface under pressure of the head of liquid in said pool.

2. A method according to claim 1, wherein said horizontal plane is established by said line of initial contact at a level in the range of from about ½ inch to about 8 inches above said line of tangency between said rolls.

3. A method according to claim 1, wherein said horiontal plane is established by said line of initial contact, at a level which is not substantially less than 1½ inches nor substantially more than 3 inches above said line of tangency between said rolls.

4. A method according to claim 1, wherein the liquid of said pool is water.

5. An apparatus for producing a cast film of a melt-extruded thermoplastic material comprising a casting roll, having a highly polished metal surface, disposed for rotation on an axis lying in a first horizontal plane; die means for extruding a film of said material downwardly into contact with said casting roll surface along a line lying in a plane extending substantially from said die means in the general direction of rotation of said casting roll into substantially tangential relation thereto; a nip roll, rotatable in contra-relation to said casting roll, disposed on an axis lying in a second plane parallel to and below said first plane, said nip roll being adapted to compress said film against said casting roll along a line of relative tangency between said rolls, said line of relative tangency lying substantially in said plane extending from said die means, means for maintaining a liquid pool between said nip roll and the exposed surface of said film compressed by said nip roll at a level vertically above said line of relative tangency but not substantially above said first plane.

6. An apparatus according to claim 5, including means for restricting access of liquid in said pool to the exposed surface of said casting roll.

7. An apparatus according to claim 6, wherein said restrictive means comprises a pair of absorbent wiper elements disposed in substantially parallel relation, spaced one from another by a distance substantially equal to the width of said film, and in frictional surface contact with said casting roll.

8. An apparatus according to claim 5, wherein said means for maintaining said liquid pool includes a liquid receiving trough, coextensive with said nip roll, encompassing a substantial portion of said roll below the level of said second horiozntal plane, and means for circulating a liquid material through said trough to a depth for submerged surface contact of said nip roll therein.

References Cited in the file of this patent

UNITED STATES PATENTS

| | | |
|---|---|---|
| 2,212,770 | Foster | Aug. 27, 1940 |
| 2,289,774 | Graves | July 14, 1942 |
| 2,364,435 | Foster et al. | Dec. 5, 1944 |
| 2,405,977 | Peters | Aug. 20, 1946 |
| 2,551,966 | Pierce | May 8, 1951 |
| 2,582,294 | Stober | Jan. 15, 1952 |
| 2,607,712 | Sturken | Aug. 19, 1952 |
| 2,624,913 | Montross et al. | Jan. 13, 1953 |
| 2,638,628 | Scott et al. | May 19, 1953 |
| 2,728,944 | Crooks | Jan. 3, 1956 |
| 2,728,951 | O'Hanlon et al. | Jan. 3, 1956 |
| 2,821,746 | Bicher | Feb. 4, 1958 |